(No Model.)
J. HOFER, G. WEIBEL & G. MARTIN.
ASH PAN.
No. 303,010. Patented Aug. 5, 1884.
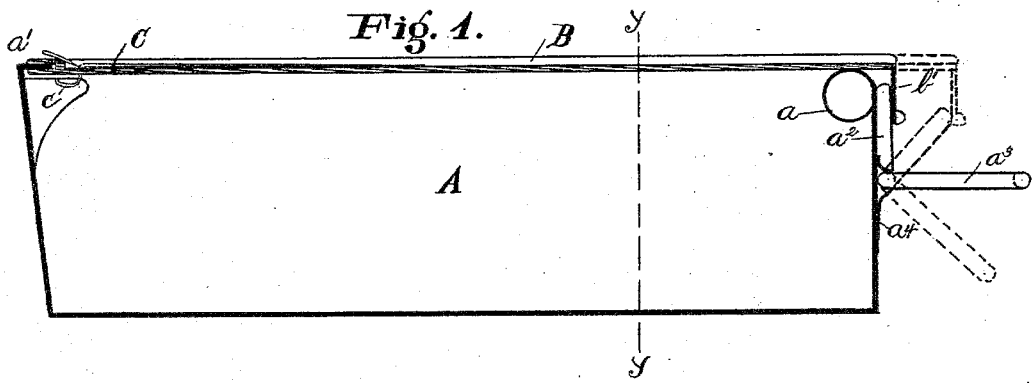
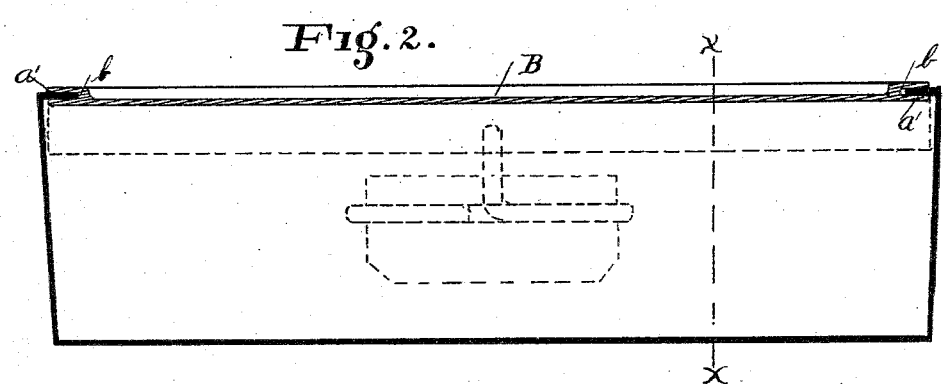
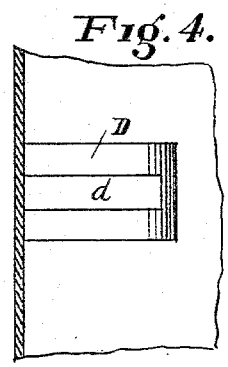
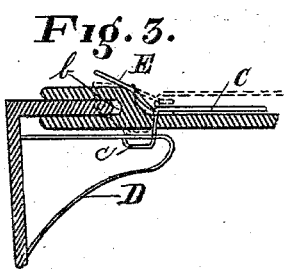
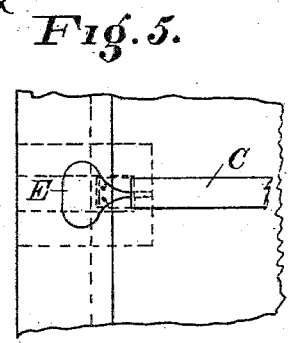
Attest
Joseph W Sims
Chas. Anderson
Inventors
Johan Hofer
Gottlieb Weibel
Godfrey Martin
By John McNill
Attorney

UNITED STATES PATENT OFFICE.

JOHAN HOFER, GOTTLIEB WEIBEL, AND GODFREY MARTIN, OF CINCINNATI, OHIO.

ASH-PAN.

SPECIFICATION forming part of Letters Patent No. 303,010, dated August 5, 1884.

Application filed February 6, 1884. (No model.)

*To all whom it may concern:*

Be it known that we, JOHAN HOFER, GOTTLIEB WEIBEL, and GODFREY MARTIN, of Cincinnati, in the county of Hamilton and State of Ohio, have invented certain new and useful Improvements in Ash-Pans, of which the following is a specification.

Our invention is in the nature of an improvement upon ash-pans and similar contrivances, and has for its object the construction of such articles with a sliding locking-lid, whereby such pans, when closed and locked, are practically sealed against escape of any portion of the contents thereof through the joint formed by lid and edge of pan.

In the accompanying drawings, Figure 1 is a longitudinal section of our improvement on line $x\ x$ of Fig. 2. Fig. 2 is a transverse section of the same on line $y\ y$ of Fig. 1. Figs. 3, 4, and 5 are detached views of the locking devices.

Similar letters of reference indicate similar parts.

A is a pan or box, of any suitable form and dimensions, provided with a cylindrical edge, $a$, at the front side, and an inwardly-projecting rim, $a'$, which runs entirely around three sides of the pan.

B is a lid or cover provided with the groove $b$, which runs entirely around the three edges of the cover corresponding to the sides of pan having the rim $a'$.

$b'$ is a lip or projection at right angles with the plane of cover, and extending the full width thereof, which engages with the arm $a^2$ of oscillating handle $a^3$, secured to pan A by the customary clip or mounting $a^4$. This handle $a^3$, with its arm $a^2$, turns in the clip $a^4$, and, in conjunction with the lip $b'$ of cover B, serves to draw the cover partially out of the pan after it is unlocked, as shown by dotted lines in Fig. 1, and when the cover is restored to its normal position the handle $a^2$ is drawn up by the lip $b'$ to occupy a position parallel to cover B, as shown by full lines of same figure. The groove $b$ of the cover and rim $a'$ of the pan fit closely, so as to form a dust-tight joint when the pan is closed.

C is a spring-strip, preferably of iron, riveted or otherwise secured to the upper surface of cover B, the free end of which projects downwardly through an opening in the cover and forms a hook, $c$, which, when the pan is closed, automatically engages with the keeper or shackle D, secured to the rear side of pan. The shackle D is provided with an oblong slot, $d$, in its upper side to receive the hook $c$.

E is a short lever, flexibly secured to the rear edge of cover B, one end of which is formed to receive pressure, as from a thumb, and the other is narrow and pointed, to engage with a corresponding perforation in the free end of strip C. When the lever E is pressed down, the hook $c$ is raised from the shackle D and the cover may be removed, which is accomplished by pressing the handle $a^3$ down, as shown by dotted lines of Fig. 1. The cover may then be removed by gripping the overhanging lip $b'$ and drawing the grooves $b$ clear of the rim or flange $a'$. The cylindrical edge $a$ of pan A permits the hook $c$ to glide freely over its surface in drawing the cover B off the pan and in returning the cover to its normal position. When the cover B is in place on the pan, the joint formed by rim $a'$ and groove $b$ is entirely dust-tight, and in removing a pan of ashes under a grate the cover is first slid on the pan and locked by the automatic engagement of hook $c$ with shackle D, and the pan may then be removed with no possibility of spilling the ash or dust to the damage of carpets, mantel ornaments, &c. The pan then is conveniently carried about by the handle $a^3$.

Our invention is applicable to other articles than ash-pans—as, for instance, dust-pans for hotel use, boxes made of tin and ornamented, to carry school-books in, and other purposes of a similar nature.

Having described our invention, what we claim is—

1. A pan or box, as A, provided with a projecting rim, $a'$, a sliding cover, as B, provided with a groove, $b$, and overhanging lip $b'$, in combination with oscillating handle $a^3$ and locking devices C, $c$, and D, when arranged and operating in the manner and for the purpose substantially as specified.

2. The combination of pan A and cover B with the spring-strip C, hook $c$, shackle D, and lever E, when arranged and operating substantially as and for the purpose specified.

In testimony whereof we have signed our names to the foregoing specification in the presence of two subscribing witnesses.

JOHAN HOFER.
GOTTLIEB WEIBEL.
GODFREY MARTIN.

Witnesses:
JOHN W. HILL,
CHAS. ANDERSON.